Jan. 7, 1936.  H. B. WHITE ET AL  2,026,808
SUCTION CLEANER
Filed July 31, 1931  5 Sheets-Sheet 3
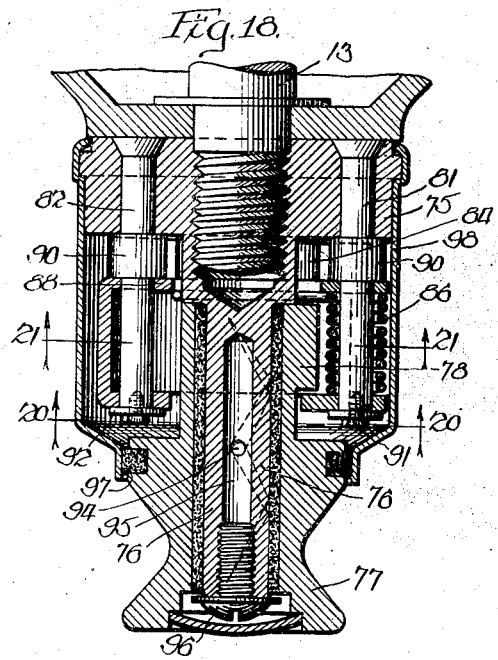
Fig. 18.
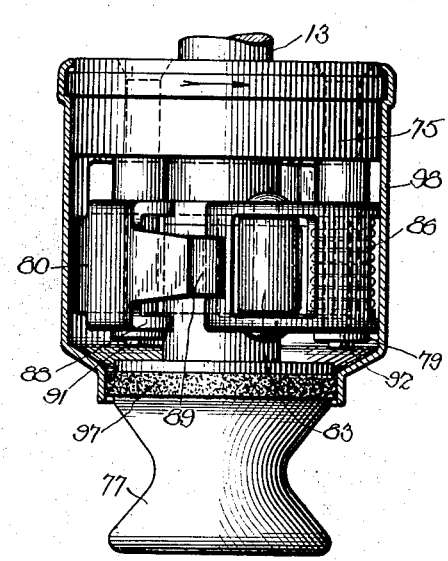
Fig. 19.
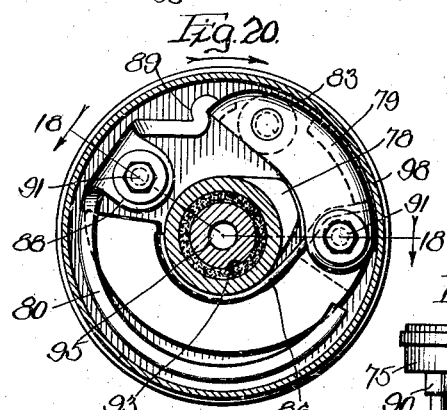
Fig. 20.
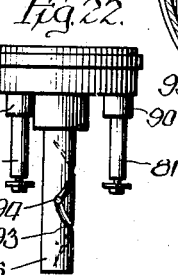
Fig. 22.
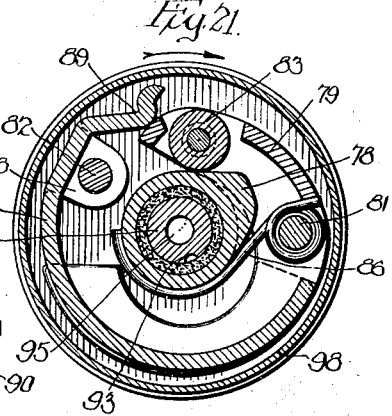
Fig. 21.
Fig. 24.
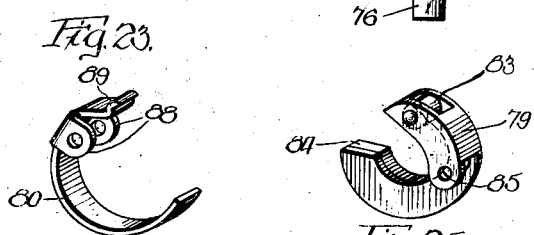
Fig. 23.    Fig. 25.
INVENTORS:
Bernard C. Becker.
Harry B. White.
Harry S. Dumaree
ATTORNEY

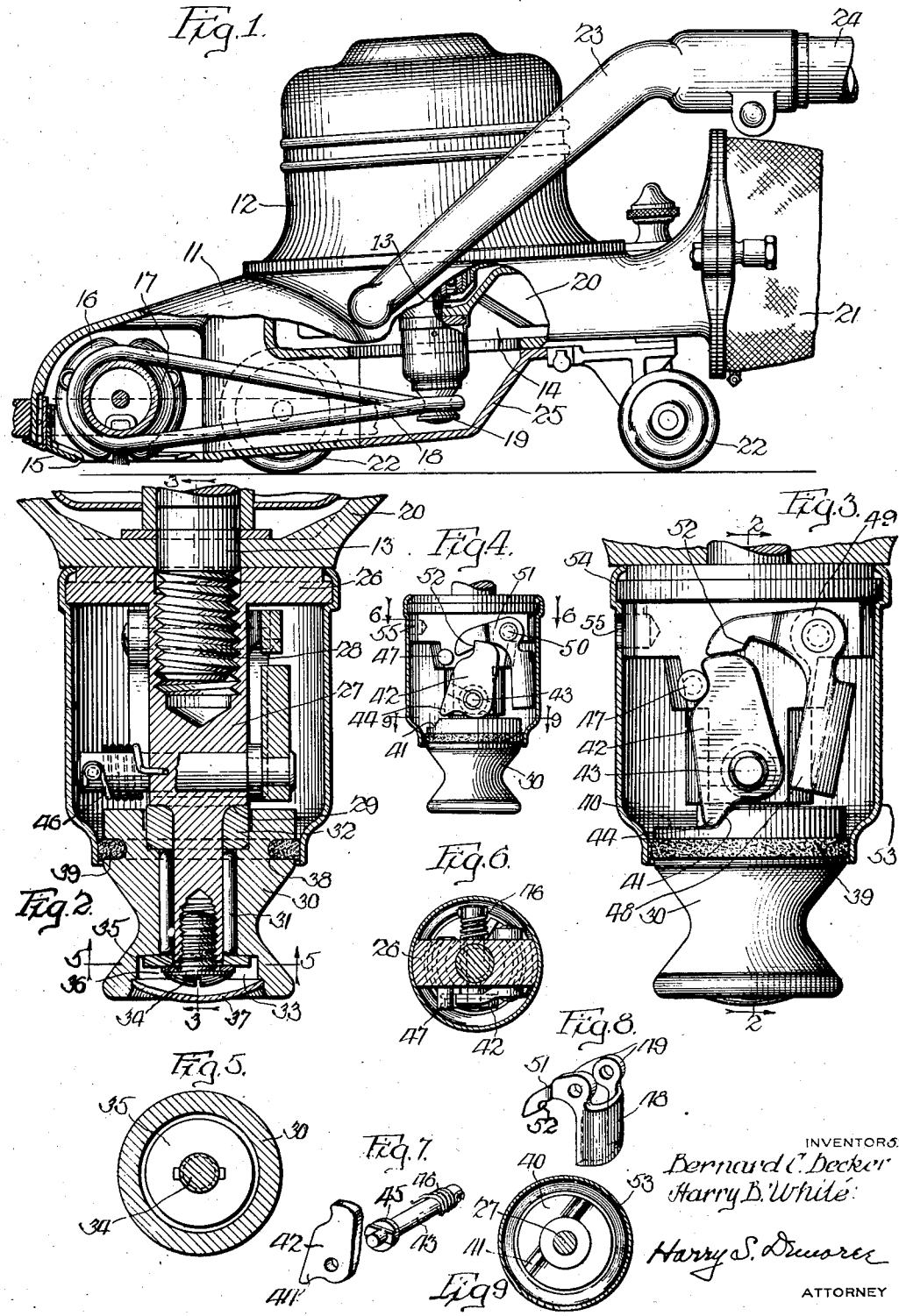

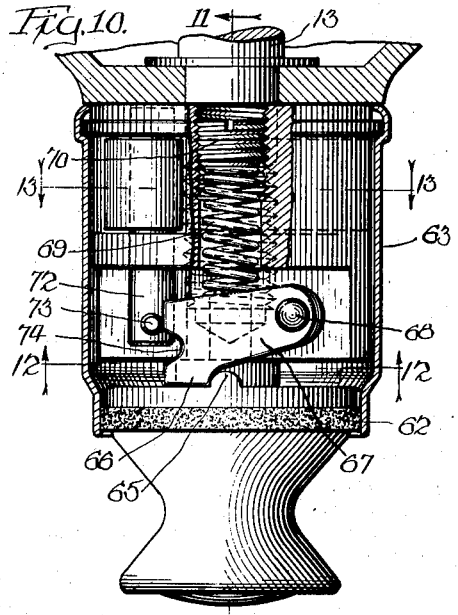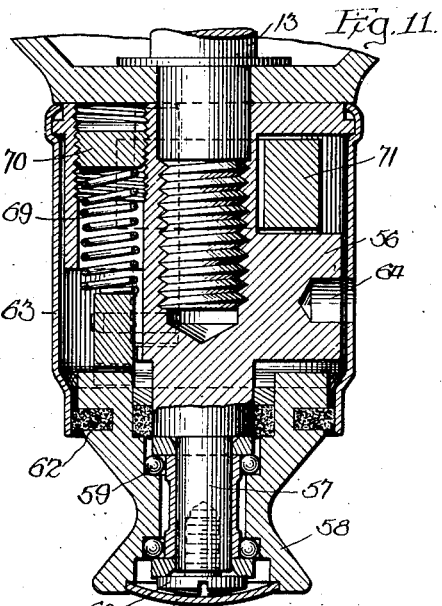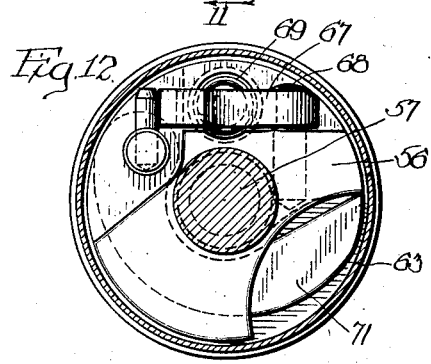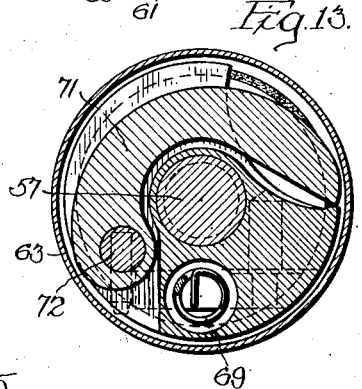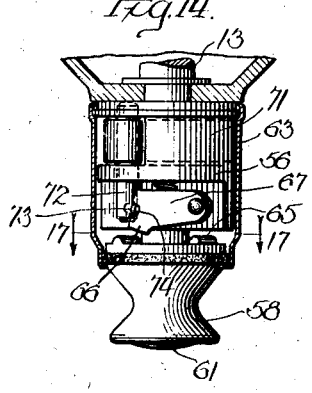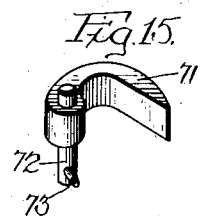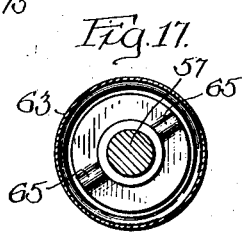

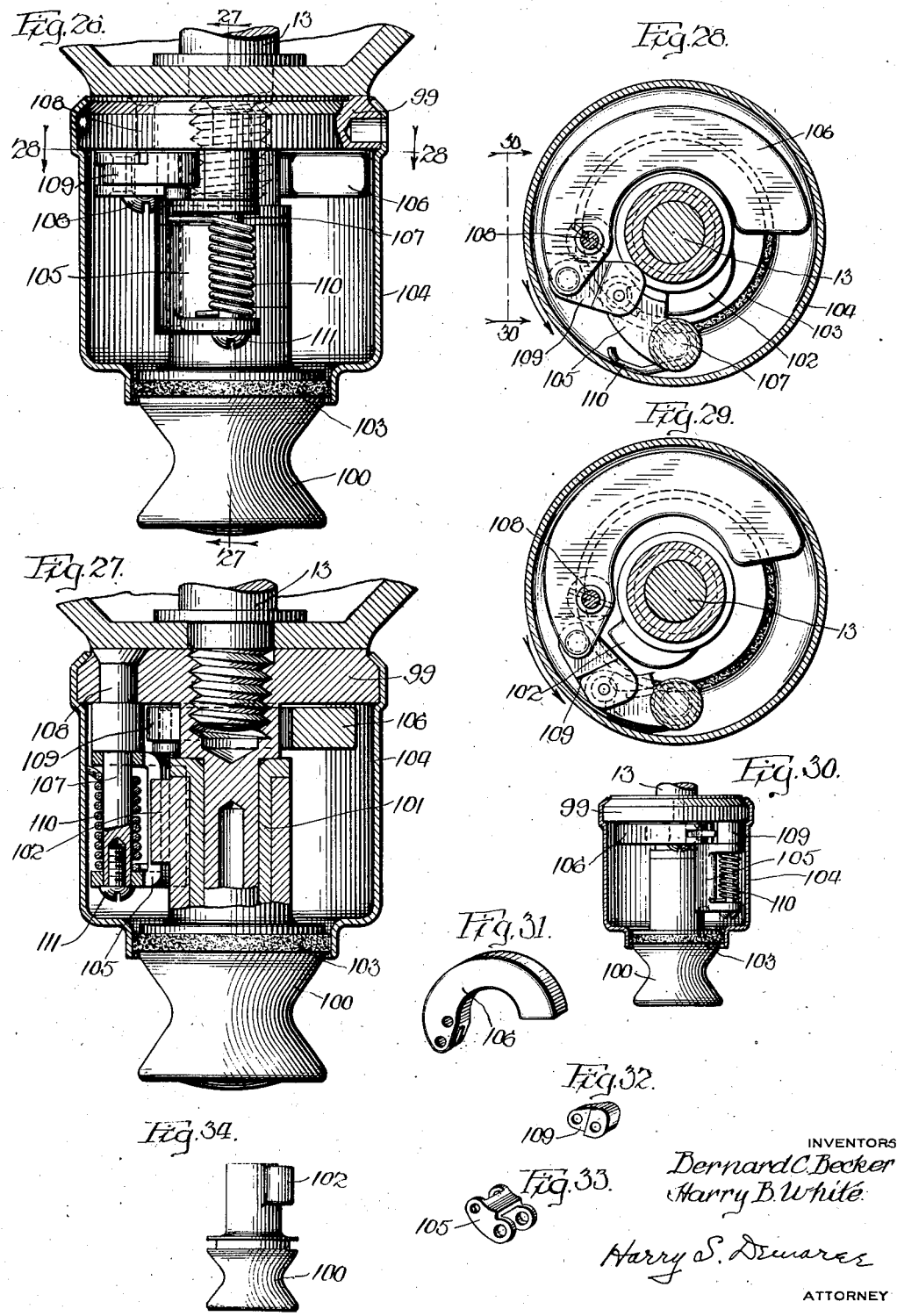

Jan. 7, 1936.   H. B. WHITE ET AL   2,026,808
SUCTION CLEANER
Filed July 31, 1931   5 Sheets-Sheet 5
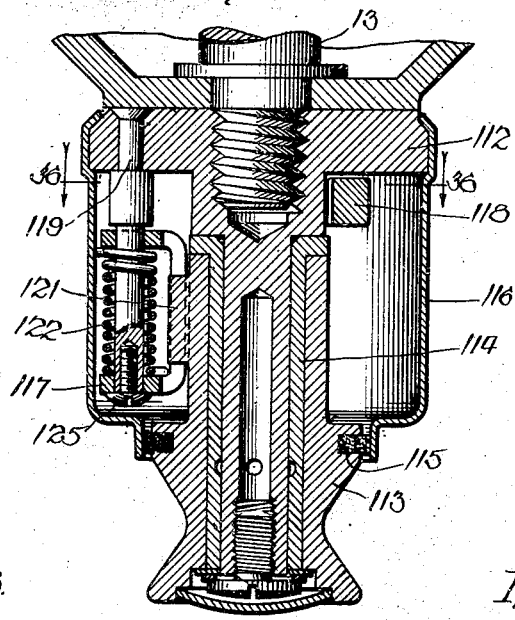
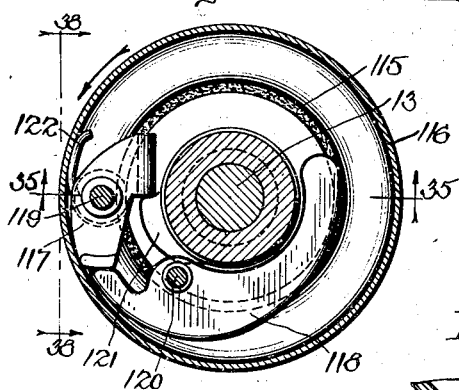
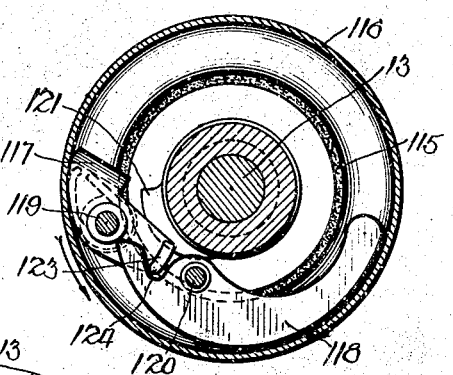
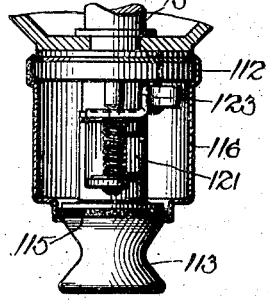
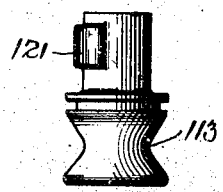
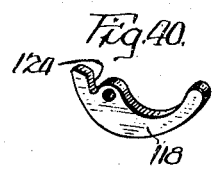
INVENTORS:
Bernard C. Becker
Harry B. White
BY
Harry S. Dewarer
ATTORNEY Patented Jan. 7, 1936

2,026,808

UNITED STATES PATENT OFFICE 2,026,808

SUCTION CLEANER

Harry B. White, Canton, Ohio, and Bernard C. Becker, York, Pa., assignors to The Hoover Company, North Canton, Ohio, a corporation of Ohio Application July 31, 1931, Serial No. 554,270

11 Claims. (Cl. 15—8)

This invention relates to power-transmitting devices particularly applicable to suction cleaners of the type embodying a carpet-agitating or beating device to dislodge the dirt, in addition to a suction-producing means for effecting a current of air through and over the carpet or other surface covering undergoing cleaning. While the invention may be utilized in other structures, where similar operation is desired, it presents particular advantages when used to control the operation of a suction cleaner of this type, and is illustrated and described herein as embodied in various forms adapted to transmit power from the shaft upon which the fan is mounted to an agitator in such a cleaner.

In operation, the agitating device of a suction cleaner sometimes becomes overloaded or stalled by reason of the carpet, threads or other objects becoming caught between the agitator and the body of the cleaner particularly if the agitator is of the rotary type. If a worm drive, or other positive drive is used, overheating and breakage of the parts are apt to result, while, when a belt drive is used, the slipping of the belt usually saves breakage of the parts but soon results in excessive overheating which may injure the pulleys and adjacent parts and cause breaking or weakening of the belt. At the same time, the starting torque of the fan of a suction cleaner is very great, and to it, at starting, is added the starting load of the agitating device, and provision must be made to transmit a certain minimum of power for starting.

One of the objects of the invention is to provide a suction cleaner of this type in which the parts will be protected from injury in the event of overload or stalling of the agitating device and permitting continued operation of the fan, so that the cleaner will act as a straight air suction cleaner. A further object is to provide such a device in which, upon excessive load upon or stalling of the agitating device, the drive thereto will be disconnected automatically and will be held from reestablishment so long as the driving means is operated, a still further object being to provide for automatic reestablishment of the drive without necessitating manual reengagement of parts. Still another object is the provision of an overload-release clutch in such a suction cleaner which is efficient and compact. Still further objects of the invention, and the novel features of the invention will be apparent from the following description of various embodiments of the invention as illustrated in the accompanying drawings, in which:

Fig. 1 is a fragmentary view in side elevation of a suction cleaner, with parts broken away to show more clearly the agitating device and the power transmitting means for operating it.

Fig. 2 is an enlarged fragmentary view, in vertical transverse section, of the driving pulley and its operating means, taken on the line 2—2 of Fig. 3.

Fig. 3 is an enlarged view in side elevation of the parts shown in Fig. 2, the casing or housing being shown in section, on line 3—3 of Fig. 2 and the elements of the clutch being shown in driving position.

Fig. 4 is a view in elevation similar to Fig. 3, but on a smaller scale and showing the parts as operated to non-driving position.

Fig. 5 is a view in horizontal cross section taken on the line 5—5 of Fig. 2.

Fig. 6 is a view in horizontal cross section taken on the line 6—6 of Fig. 4.

Figs. 7 and 8 are views in perspective showing in detail various elements of the structure shown in Figs. 1 to 6.

Fig. 9 is a view in horizontal cross section on the line 9—9 of Fig. 4.

Fig. 10 is an enlarged view in elevation similar to Fig. 3 but showing a modified form of clutch structure.

Fig. 11 is an enlarged view in vertical section, on line 11—11 of Fig. 10, and similar to Fig. 2, of the parts shown in Fig. 10.

Fig. 12 is a view in horizontal section taken on the line 12—12 of Fig. 10.

Fig. 13 is a view in horizontal section taken on the line 13—13 of Fig. 10.

Fig. 14 is a view in elevation, on a reduced scale, showing the clutch elements of the structure shown in Figs. 10 to 13 in non-driving position.

Figs. 15 and 16 are views in perspective, on a reduced scale, of various elements of the clutch structure shown in Figs. 10 to 13.

Fig. 17 is a view in horizontal section taken on the line 17—17 of Fig. 14.

Fig. 18 is an enlarged view in vertical section, similar to Fig. 2, and showing a third modification of clutch structure.

Fig. 19 is an enlarged view in elevation similar to Fig. 3 showing the driving elements of the clutch in driving relationship.

Fig. 20 is a view in horizontal section of the structure shown in Fig. 18 taken on the line 20—20 of Fig. 18.

Fig. 21 is a view in horizontal section, taken on the line 21—21 of Fig. 18.

Fig. 22 is a view in side elevation, on a reduced scale, of one of the clutch elements shown in Fig. 18.

Figs. 23 and 25 are views in perspective, on a reduced scale, of members of the clutch shown in Fig. 18.

Fig. 24 is a view in side elevation, on a reduced scale, of the driven member of the clutch and pulley shown in Fig. 18.

Fig. 26 is a view in side elevation, on an enlarged scale, similar to Fig. 3 showing a fourth modification of clutch structure.

Fig. 27 is a view in vertical section, on an enlarged scale, similar to Fig. 2, taken on the line 27—27 of Fig. 26.

Figs. 28 and 29 are views in horizontal section taken on the line 28—28 of Fig. 26, showing the position of the clutch parts when in driving relationship and non-driving relationship, respectively.

Fig. 30 is a view in side elevation on a reduced scale, similar to Fig. 26, but showing the parts rotated 90 degrees.

Figs. 31, 32, and 33 are views in perspective, on a reduced scale, of various elements of the clutch structure shown in Fig. 26.

Fig. 34 is a view in side elevation, on a reduced scale, of the driven clutch member and pulley shown in Fig. 26.

Fig. 35 is a view in vertical section, on an enlarged scale, similar to Fig. 2, on line 35—35 of Fig. 36, showing a fifth modification of clutch structure.

Figs. 36 and 37 are views in horizontal section, taken on the line 36—36 of Fig. 35, and showing the clutch elements in driving and non-driving relationship, respectively.

Fig. 38 is a view in side elevation, on a reduced scale, showing the clutch parts of Fig. 35 as rotated 90 degrees.

Figs. 39 and 40 are views in perspective, on a reduced scale, of elements of the clutch structure shown in Fig. 35; and Fig. 41 is a view in side elevation showing, on a reduced scale, the driven clutch member and pulley shown in Fig. 35.

As shown in Fig. 1, the present invention is embodied in an overload-release clutch mechanism to transmit power to a driving pulley which, in turn, operates an agitating means. In all of the modifications shown, the clutch mechanism is interposed between the motor shaft upon which a fan is mounted and the driving pulley, but it will be apparent that any suitable power transmitting means may be substituted for the pulley belt drive shown.

As shown in Fig. 1, a main suction cleaner casing 11 carries a motor 12, having a vertical shaft 13, the casing having a fan chamber 14 therein connected to a nozzle opening 15, in which there is mounted a rotary member 16 which is adapted to agitate the carpet or surface covering being cleaned. The rotary agitator is provided with a driven pulley 17 connected by belt 18 with a driving pulley 19, mounted on the lower end of the motor shaft. A suction producing fan 20 is mounted upon the motor shaft above the pulley 19, discharging rearwardly into a dust filtering bag 21, and the cleaner as a whole is mounted upon supporting wheels 22 and provided with a bail 23 and a handle 24 by which it may be directed over the surface undergoing cleaning, it being understood that the nozzle opening 15 is elevated above the plane determined by the supporting wheels and that the carpet is drawn up against such opening by the suction creating means into the path of movement of the agitating means. A portion 25 of the lower wall of the main casing is preferably removable, and latched in place, to provide access to the pulley 19 and the belt 18.

In a suction cleaner of this type, the starting torque of the fan is comparatively high, decreasing as the fan approaches operating speed, but varying somewhat with the volume of air handled, which in turn is determined by the effective seal of the carpet against the suction mouth. While an agitator such as that shown in Fig. 1 has an appreciable starting load, it is much less than the operating load effected by its engagement with the carpet when the carpet has been drawn up against the suction mouth. If a belt drive is used and the agitating means becomes stalled, or its operation is seriously impeded, the belt slips upon the smaller pulley, which is usually the driving pulley, overheating the parts and seriously injuring or destroying the belt. In accordance with the present invention, an overload release clutch structure is provided, between the shaft upon which the fan is mounted and the agitator, which is sufficiently compact as to be interchangeable with the pulley structure normally used, which will permit operation of the fan while the parts are in their disengaged condition without overheating, which will normally transmit ample power for driving the agitator, and which upon disengagement will have the parts thereof positively held in disengaged position, thus obviating noise and wear of the parts which would result if the parts could move gradually towards engaged position.

In the modified form shown in Figs. 1 to 9, the body member 26 of the driving part of the clutch is provided with a central portion 27 which is threaded upon the lower threaded end 28 of the motor shaft 13 and acts as a nut to secure the fan 20 to the shaft. The lower end of the portion 27 is reduced to form a shoulder 29, and upon this reduced end a pulley 30 is rotatably mounted upon pin roller bearings 31, a thrust ring 32 engaging the upper end of the bearing members 31 and the shoulder 29. The lower face of the pulley is preferably recessed at 33, and a screw 34 is threaded into the end of the portion 27 and provided with a wear disc 35 and washer 36, to hold the pulley 30 rotatably mounted upon the portion 27. The recess 33 is preferably closed by a disc 37 pressed therein, and the upper end of the pulley is preferably provided with an annular channel 38 to receive a dust excluding ring 39 of felt or similar material. The upper face of the pulley 30 is cut away, as shown at 40 in Figs. 3, 4, and 9, to form an inclined and slightly rounded abutment or cam 41, which extends at a slight angle to the radius, and is adapted to receive the driving thrust by which the pulley is rotated.

The driving part of the clutch comprises a plate 42, secured to a laterally extending pivot pin 43 which is rotatably mounted in the member 27, the plate 42 being provided with a downwardly extending finger 44 normally in driving engagement with the abutment 41 but movable to a position above the top of the pulley, as shown in Fig. 4. As shown in Figs. 2 and 7, pin 43 is preferably provided with an integral thrust collar or flange 45, and it and the plate 42 are provided with interengaging parts to prevent relative rotation when they have been riveted together. A coil spring 46 surrounds the pin 43, engaging at one end with a projection on the pin 43 and at the other end in a notch in the body member 27, to rotate the plate member 42 toward driving position, in which position the upper end of the plate member 42 engages a suitable stop 47 on the body member 27.

A centrifugally operated latch 48 is pivotally mounted upon the body member 27, preferably having spaced lugs 49 on opposite sides of the body member 27, as shown in Fig. 6, through which and the body member 27 a pivot pin 50 is engaged. The latch member 48 has an arm 51 extending over the plate member 42, and normally engaging frictionally against the end of the plate member 42, with a pressure dependent upon the speed of rotation, and normally assisting in holding the plate member 42 in driving position. The arm 51 is provided with a notch 52 which receives the end of the plate member 42 and holds it out of driving position as shown in Fig. 4, when the plate member 42 has been forced to such position. Since the center of mass of the plate member 42, when in driving position, is at one side of the pin 43, it will be apparent that the centrifugal action tends to hold the plate 42 in driving position. Consequently, when the pulley is retarded sufficiently to cam the finger 44 out of the path of abutment 41 sufficient force must have been exerted to overcome the action of the spring 46, the centrifugal action upon the plate member 42 until it reaches center position and the very considerable friction exerted by the arm 51 upon the end of the member 42. After plate member 42 reaches central position, the centrifugal action will assist in forcing it toward non-driving position. After the drive has been interrupted, and the parts are in the position in Fig. 4, if the motor is stopped, the spring 46 will swing the plate member 42 to driving position, since there is no longer any opposition to the movement of the plate member 42 and the latch 48 by reason of centrifugal action. Such movement will not occur, however, until the speed of rotation is practically zero, and chattering or ratcheting of the finger 44 upon the abutment 41 as it approaches driving position is avoided.

The clutch parts are preferably shielded from dust and moisture by a tubular casing 53, preferably of light metal, shaped to surround the upper end of the pulley so as to be engaged by the felt strip 39, and having its upper end crimped into place upon the upper circular portion of the body member 27 as shown at 54. An opening 55 is preferably provided through the casing member 53 and extending into the body portion 27, to receive a spanner wrench or other tool by which the clutch and pulley assembly, as a unit, may be conveniently mounted upon the threaded end of the motor shaft.

In the modified structure shown in Figs. 10 to 17, a clutch body 56, threaded upon the lower end of motor shaft 13, has a reduced lower end 57 upon which a pulley 58 is rotatably mounted by a ball bearing structure indicated generally at 59, the pulley being held in place by a screw 60, preferably located in a recess in the lower face of the pulley which is closed by a friction disc 61, a ring 62 of felt or similar material and a tubular casing 63 crimped in place upon the member 56, being provided to exclude dirt, and an opening 64 being formed in the body member 56 and the casing 63 to receive a spanner wrench or similar tool. In this modification rounded abutments 65 project upwardly from the upper face of the pulley 58 and extend radially, being engaged and driven by a finger 66, on a plate member 67 which is pivotally mounted upon a pin 68 extending laterally from the body member 56. A helical compression spring 69 is located in a vertical bore in the body member 56, and is held in place, and is adjustable, by a screw 70, to hold the parts in driving relationship. A latch lever 71, as shown in Fig. 15, is rigidly mounted upon a vertically extending pin 72 which is pivotally mounted in the body member 56, and is provided with a laterally extending finger 73 normally engaging against the end of the plate member 67, and adapted to engage in a notch 74 in the end thereof, as shown in Fig. 14, when the plate member 67 has been forced upwardly out of driving position.

In general the operation of this modified structure will be like that of the structure shown in Figs. 2 to 9, the plate member 67 being held in driving position by reason of the action of the spring 69 and the frictional engagement of the finger 73 against the end of the member 67 resulting from the centrifugal action upon the lever 71. When the plate member 67 has been forced upwardly by reason of an overload upon the pulley it will be held in disengaged position by engagement of the finger 73 in the notch 74, and the lower end 57 of the body member 56 can rotate freely within the pulley 58 by reason of the anti-friction bearing mounting. When the motor is stopped and the body member 56 is brought substantially to rest the spring 69 will force plate member 67 to driving position, the edge of the notch 74 acting as a cam engaging the finger 73 to rotate lever 71 back to the position shown in Fig. 13.

In the modification shown in Figs. 18 to 25, a clutch body member 75 is utilized which is of simple construction, having an enlarged head which is threaded upon the motor shaft 13, and a reduced lower end 76, upon which pulley 77 is rotatably mounted, a bushing of graphite-embedded, anti-friction composition being provided between the parts to avoid unusual heating if the motor is continued in operation when the pulley is stalled. The pulley 77 is formed with an upwardly extending portion provided with a laterally extending cam 78, and a driving member 79 and a latch member 80 are mounted, respectively, upon studs 81 and 82, which are preferably identical, riveted in place in the upper enlarged portion of the body member 75 and extending parallel to the axis of the lower reduced portion 76. As shown in Fig. 25, the driving member 79 may be formed as a sheet-metal stamping comprising laterally spaced arcuate plates between which a roller 83 is pivotally mounted, and a counterweight 84 is riveted or spot welded, or otherwise secured to one side member, the side members having openings 85 so that the element as a whole can be pivotally mounted upon the stud 81, with a helical spring 86 surrounding the stud and having one end in engagement with the member 79 and the other end engaging the main body member 75, so as normally to force the roller 83 inwardly into the path of the cam or abutment 78.

As shown in Fig. 23, the latch member 80, which also may be conveniently formed as a sheet metal stamping, has a long arm which is curved and lies between the planes of the side members of the driving member 79, tabs 88 being bent in from its edges and perforated to facilitate mounting upon stud 82, and its shorter end being bent inwardly and then outwardly as shown at 89, in Figs. 20, 21, and 23, to engage frictionally against the end of member 79 in normal driving position, and to act as a pawl or latch for holding the member 79 out of driving position as shown in Fig. 20. The studs 81 and 82 are preferably provided with enlargements 90, and screws 91, and washers 92 may conveniently be used to hold the driving member 79 and the latch 87 upon their studs. In order to lubricate the antifriction bushing 80, the lower end 76 of the body member upon which it is mounted is preferably provided with oil grooves 93 communicating with an oil port 94 extending to a central reservoir 95, which is closed by the screw 96, by which the pulley is held in assembled relation. A dust-excluding packing ring 97, located in a groove in the pulley, and a tubular casing 98, crimped at its upper end to the body member 75, are preferably provided as in the other modifications.

It will be apparent that this embodiment of the invention can be economically manufactured and that its operation will be substantially like that of the structures shown in Figs. 2 to 17, the provision of the roller 83 materially lessening the chances of variation in operation which might otherwise result from wear of the engaging surfaces of the driving member and the abutment on the pulley upon repeated operation.

In the modification shown in Figs. 26 to 34 a clutch body member 99 is threaded upon the lower end of the motor shaft 13 and has a reduced lower end rotatably supporting the pulley 100 upon an anti-friction bushing 101, the upper part of the pulley being provided with a radially extending abutment 102, and the clutch mechanism being protected from dust by a packing ring 103 and a tubular casing 104, which is crimped in place about the upper end of the body member. A driving member 105 and a weighted latching lever 106 are pivotally mounted upon studs 107 and 108, respectively, which are riveted to the upper portion of the body member 99 and extend parallel to its axis, the free end of the driving member and the latching lever being connected by a link 109, so that, as shown in Fig. 28, the centrifugal action transmitted from the lever through the link to the driving member will normally tend to hold it in driving relationship. When the driving member 105 has been forced out of driving relationship, as shown in Fig. 29, the latching lever 106, through the link 109 will hold the driving member out of driving position, the connection of the parts being such as to provide an over-center, toggle action. A spring 110 surrounds the stud 108, one end engaging the driving member 105 and the other end engaging the casing 104 and normally tending to move the driving member 105 toward driving position, a screw 111 preferably being used to hold the spring and the driving member in place upon the stud 108. As shown in Fig. 33 the driving member may conveniently be formed of a stamping of sheet metal having its sides bent to parallel relationship at right angles to the body portion thereof.

In general, the operation of this modification will be substantially the same as that of the modifications previously described, and the effect of the toggle action between the parts will be to prevent the possibility of their occupying any intermediate position for any great length of time, the centrifugal action upon the levers 106 acting to throw the driving member 105 either to one side or the other of its center position. The parts can be economically manufactured and readily assembled, and the driving member will be positively held out of driving position by the centrifugal action upon the latch lever 106, until the rotation of the body member 99 has substantially ceased, and such centrifugal action can no longer overcome the action of the spring 110.

The modification shown in Figs. 35 to 41 comprises a clutch body member 112, having an axially extending reduced portion upon which a pulley 113 is mounted for rotation, upon an interposed bushing 114 of anti-friction composition, and with an oil reservoir therein for supplying lubricant, dust being excluded by the packing ring 115 and a tubular casing 116 crimped about the upper end of the body portion 112. The driving member 117 and the latching lever 118 are pivotally mounted upon studs 119 and 120 respectively, which are riveted through the upper end of the body portion 112 and extend parallel to the axis, the pulley 113 having a laterally extending abutment 121 adjacent its upper end. As shown in Fig. 39 the driving member 117 may conveniently be formed as a sheet metal stamping having parallel side members between which a helical spring 122 may be positioned, about the stud 120, to engage the driving member and the casing 116 at its respective ends and force the driving member towards driving position. One of the side members of the driving member 117 is bent upwardly as shown at 123, to project into the path of the latching lever 118. When the parts are in normal driving relationship, as shown in Fig. 36, the end of the latching lever 118 engages the end of the driving member 117 and frictionally opposes any movement thereof. A notch 124 is provided in the latching lever 118 adjacent its end to receive the finger 123 and hold the driving member out of driving relationship as shown in Fig. 37. The operation of the structure will be similar to that of the other modifications described, and it will be apparent that the parts are of simple construction and may be manufactured economically and with great accuracy.

In all of the modifications shown and described, not only will danger of breakage or injury to the parts be avoided by the automatic release of the clutch, but the drive will be automatically reestablished when the motor is de-energized and before the driving shaft comes to rest. The clutch parts will not gradually approach driving position, in which case there would be a ratcheting of the parts which would rapidly wear down the engaging surfaces and thus alter the load at which the clutch would release, but are quickly disengaged or engaged, the driving member moving to or from its driving position in a manner similar to the movement of the contact member of a double snap electric switch. While the stopping of the agitating means and the change in speed of the motor furnish sufficient audible warning that the motor should be stopped and the obstruction removed, the provision of anti-friction bearings between the pulley and its mounting permit long continued operation of the motor and functioning of the device as a straight air suction cleaner while the agitating device is stalled without injurious heating.

It will be understood that in all of the modifications the body part of the clutch is adapted to be detachably secured to a shaft terminal and that the pulley, or other power transmitting member, is carried by such body member, so that all of such parts constitute a single assembly and can be handled as a unit. While the fan could be secured to the shaft by other means, it is preferable that, as shown, the body member of the clutch be used as a nut to secure the fan in place.

It will also be apparent that many changes may be made in arrangement of the parts and the drive from the motor shaft to the agitating device, so long as the clutch is located between the fan and the agitating device, and that numerous other changes may be made in similar details of construction within the scope of the invention disclosed in the embodiments thereof shown and described, such invention being defined in the following claims.

We claim:

1. A suction cleaner, comprising suction producing means and means for agitating the surface covering to be cleaned, driving means, said suction producing means being operatively connected to said driving means, power transmitting means operatively connecting said driving means and said agitating means and including a clutch located in the drive between said suction producing means and said agitating means and comprising members disengageable by overload, and means responsive to the speed of said driving shaft for preventing reengagement of said clutch members.

2. A suction cleaner, comprising suction producing means and means for agitating the surface covering to be cleaned, a driving shaft, said suction producing means being operatively connected to said driving shaft, power transmitting means operatively connecting said driving shaft and said agitating means and including a power transmitting member mounted on said shaft and a clutch comprising a driven member and a driving member, said driving member being operable by overload upon said driven member to a position out of engagement with said driven member, said clutch being located in the drive between said suction producing means and said agitating means, and means responsive to the speed of said driving shaft for holding said clutch members disengaged.

3. A suction cleaner, comprising suction producing means and means for agitating the surface covering to be cleaned, a motor driving said suction producing means, means for transmitting power from said motor to said agitating means including a clutch located in the drive between said suction producing means and said agitating means, and comprising a driven member and a rotary driving member having a part pivotally mounted thereon and movable from power transmitting engagement with said driven member upon overload on said driven member, and means for holding said part out of power transmitting engagement.

4. A suction cleaner, comprising suction producing means and means for agitating the surface covering to be cleaned, a motor, a member driven by said motor and operatively connecting said suction producing means to said motor, power transmitting means operatively connecting said member and said agitating means independently of the connection of said motor to said suction producing means and including a rotatably mounted driving shaft operatively connected to said motor and a driven member rotatably mounted on said shaft and operatively connected to said agitating means, said driven member having a shoulder thereon and said driving member having thereon a movably mounted projection, a centrifugally operable member normally tending to hold said projection in shoulder engaging position and adapted to hold said projection out of shoulder engaging position when said projection has been disengaged from said shoulder by overload upon said driven member.

5. A suction cleaner, comprising suction producing means and means for agitating the surface covering to be cleaned, a motor, a member driven by said motor and operatively connecting said suction producing means to said motor, power transmitting means operatively connecting said member and said agitating means independently of the connection of said motor to said suction producing means and including a rotatably mounted driving shaft operatively connected to said motor and a driven member rotatably mounted on said shaft and operatively connected to said agitating means, said driven member having a shoulder thereon and said driving member having thereon a movably mounted projection, a centrifugally operable member normally tending to hold said projection in shoulder engaging position and adapted to hold said projection out of shoulder engaging position when said projection has been disengaged from said shoulder by overload upon said driven member and means enclosing said movably mounted projection and said centrifugally operated member.

6. A suction cleaner, comprising suction producing means and means for agitating the surface covering to be cleaned, a motor operatively connected to said suction producing means, means for transmitting power from said motor to said agitating means and including a clutch adapted to be disengaged by overload upon said agitating means, the connection between the motor and said suction producing means being independent of said clutch, means responsive to the speed of said motor adapted to hold said clutch disengaged, and means adapted to reengage said clutch when the speed of said motor is reduced.

7. A suction cleaner, comprising means for agitating the surface covering to be cleaned, a motor having a shaft, a suction producing member on said shaft, and power transmitting means operatively connecting said shaft and said agitating means including a body member detachably secured to said shaft and securing said suction producing member thereto, a pulley rotatably mounted on said body member, clutch parts for transmitting drive from said body member to said pulley disengageable upon overload on said pulley, and means carried by said body member and surrounding a portion of said body member and a portion of said pulley and enclosing said clutch parts.

8. A suction cleaner, comprising means for agitating the surface covering to be cleaned, a motor having a shaft, suction producing means operatively connected to said shaft, and power transmitting means operatively connecting said motor shaft and said agitating means including a driving and clutch assembly adapted to be assembled as a unit upon said motor shaft, the connection between said shaft and said suction producing means being effected by assembly of said clutch assembly on said shaft, said driving and clutch assembly comprising a base member having a driving member carried thereby provided with a driving projection, said base member having a shaft portion, a power transmitting member rotatably mounted upon said shaft portion and having a driven projection thereon adapted to be engaged by said driving projection, said driving projection being movably mounted on said base member for movement from the path of said driven projection upon relative movement of said driving member and said power transmitting member, resilient means normally holding said driving projection in the path of said driven projection, and a centrifugally operated latch member carried by said base member directly engaging said driving member for holding said driving projection out of the path of said driven projection.

9. A suction cleaner, comprising suction producing means and means for agitating the surface covering to be cleaned, driving means operatively connected to said suction producing means, power transmitting means operatively connecting said driving means and said agitating means, said power transmitting means including a driving part and a driven part having disengageable members, one of said members being movably mounted for effecting disengagement, and centrifugally operated means for controlling the movement of said movably mounted member.

10. A suction cleaner, comprising means for agitating the surface covering to be cleaned, a motor comprising a driving shaft, a suction producing member on said shaft, and power transmitting means operatively connecting said motor shaft and said agitating means including a driving and clutch assembly adapted to be assembled as a unit upon said motor shaft and to secure said suction producing member on said motor shaft, said driving and clutch assembly comprising parts disengageable by overload upon said agitating means.

11. A suction cleaner, comprising suction producing means and means for agitating the surface covering to be cleaned, a motor having a shaft, a member detachably connected to said motor shaft and operatively connecting said suction producing means to said motor shaft, power-transmitting means operatively connecting said member and said agitating means including a shaft portion carried by said member and a power-transmitting member rotatably mounted on said shaft portion of said member, said member and said power-transmitting member having projections cooperating to transmit rotary motion, the projection on said member being movable by relative movement of said member and said power-transmitting member from the path of the projection on said power-transmitting member by overload upon said power-transmitting member, and means controlled by rotative movement for holding said movable projection in disengaged position, said power-transmitting member and said controlling means being assembled as a unit with and supported by said member.

HARRY B. WHITE.
BERNARD C. BECKER.